United States Patent [19]

Kobayashi

[11] Patent Number: 4,512,067
[45] Date of Patent: Apr. 23, 1985

[54] METHOD OF MAKING LIQUID CONTAINER HAVING ELECTRODE PLATES TO DETECT LIQUID LEVEL BY MEASURING CAPACITANCE

[75] Inventor: Hiroshi Kobayashi, Yokohama, Japan

[73] Assignee: Nissan Motor Company, Limited, Yokohama, Japan

[21] Appl. No.: 591,238

[22] Filed: Mar. 20, 1984

Related U.S. Application Data

[63] Continuation of Ser. No. 330,782, Dec. 14, 1981.

[30] Foreign Application Priority Data

Dec. 15, 1980 [JP] Japan .............................. 55-175875
Dec. 29, 1980 [JP] Japan .............................. 55-188969
Aug. 27, 1981 [JP] Japan .............................. 56-133274

[51] Int. Cl.$^3$ ............................................ H01G 7/00
[52] U.S. Cl. ................................. 29/25.41; 73/304 C
[58] Field of Search .................. 73/304 C; 324/61 P; 361/284; 29/25.41, 25.42, 595

[56] References Cited

U.S. PATENT DOCUMENTS

| | | | |
|---|---|---|---|
| 1,595,810 | 8/1926 | Allcutt | 29/25.41 |
| 2,280,678 | 4/1942 | Waymouth | 73/304 C |
| 2,426,252 | 8/1947 | Thomson | 361/284 |
| 3,067,385 | 12/1962 | Rykoskey | 324/61 P |
| 4,038,871 | 8/1977 | Edwards | 73/304 C |
| 4,209,740 | 6/1980 | Marthe | 73/304 C |

FOREIGN PATENT DOCUMENTS 1037715  8/1958  Fed. Rep. of Germany .
53-54670  3/1978  Japan .

OTHER PUBLICATIONS

Japanese Utility Model Publication No. 40-4539, (Feb. 2, 1965), "Device to Measure Liquid Quantity".
Japanese Utility Model Publication No. 48-52559, (Apr., 1973), "Device to Regulate Capacitance in Liquid Quantity Gauge of Capacitor Type".
Japanese Utility Model Publication No. 49-74252, (Apr., 1974), "Liquid Quantity Gauge".

*Primary Examiner*—Charles Frankfort
*Assistant Examiner*—Denis E. Corr
*Attorney, Agent, or Firm*—Lowe, King, Price & Becker

[57] ABSTRACT

Liquid level measuring capacitors, each having two vertically disposed generally polygonal plates, are made by preparing a provisional assembly including a first electrode plate having plural holes and a baffleplate shape. A second electrode plate opposite to the first electrode has plural holes corresponding to the first electrode plate holes. A one-piece dielectric spacer network inserted between the plates includes plural annular spacers arranged correspondingly to the holes of the plates. The spacer has zigzag connecting bars to breakably connect a number of the spacers to one another by relatively weak joints with a generally arc-like part of the outer periphery of each spacer. A fastener is inserted in the center hole of each spacer through aligned holes of plates. Each fastener is fixed to the plates. The end portions of the connecting bars are pulled to break and separate spacers. The separated connecting bar is separated from the provisional assembly, so the provisional assembly is converted into the electrode plate assembly and plural spacers remain sandwiched between the plates and are spaced from one another.

14 Claims, 25 Drawing Figures

METHOD OF MAKING LIQUID CONTAINER HAVING ELECTRODE PLATES TO DETECT LIQUID LEVEL BY MEASURING CAPACITANCE

This application is a continuation of Application Ser. No. 330,782, filed 12/14/81.

BACKGROUND OF THE INVENTION

This invention relates to a liquid container which includes a probe part of a liquid gauge of the type for electrically detecting the quantity of liquid existing in the container by utilizing a variation in the capacitance between two metal plates vertically disposed in the container. For example, the liquid container is useful as a fuel tank in a vehicle.

As is known, it is possible to detect the quantity of a liquid existing in a container by fixedly and vertically disposing two flat and parallel electrode, or a cylindrical electrode and a concentric electrode in the container and measuring capacitance between these two electrodes. This structure is based on the fact that most liquid materials have dielectric constants considerably different from the dielectric constant of air. Assuming that the two electrode plates are opposite to each other in a surface area S with a definite distance d therebetween and that the electrode plates are submerged in the liquid by a fraction (x) of the effective surface area S, the capacitance C between these two plates is given by the following equation:

$$C = E_L \frac{S \cdot x}{d} + E_A \frac{S(1-x)}{d} = \frac{S \cdot x}{d}(E_L - E_A) + \frac{E_A}{d} \quad (1)$$

where $E_L$ is the dielectric constant of the liquid, and $E_A$ is the dielectric constant of air.

As the liquid level in the container rises and falls, the submerged fraction x of the electrode surface area S increases or decreases with corresponding increases or decreases in the value of the capacitance C. By suitably selecting the shape of the electrode plates, it is possible to establish a practically linear relationship between the liquid level or the quantity of liquid existing in the container and the capacitance C since there is a linear relationship between x and C in the above equation.

In practical liquid gauges based on the above described principle, it is popular to utilize the variation in the capacitance (C) to vary the frequency (f) of a pulse signal generated by an oscillator circuit including a resistance R connected in series with the capacitor constituted of the two electrode plates to determine a time-constant. In that case, the relation between the capacitance C and the frequency f is expressed in the following way:

$$f \propto \frac{1}{CR} \quad (2)$$

By utilizing the variation in the frequency f of the pulse signal, the liquid level in the container is indicated on a meter which may be either of an analog or digital type.

When a liquid container of the described type is in a stationary state there is little problem in detecting the liquid level by this method. However, the situation is different when the liquid container is installed as a fuel tank of a vehicle such as an automobile. In this case difficulties arise in accurately detecting the quantity of fuel existing in the fuel tank during running of the vehicle because the fuel tank inclines to various degrees and the fuel makes inclining and/or undulating movements and even undergoes an unbalanced displacement toward one side by the action of a centrifugal force when the vehicle rounds a curve on the road. The difficulties are augmented by rapid and great changes in the fuel level attributed to the fact that the fuel tank is shallow relative to its lateral widths and usually has an asymmetric shape in plan view. Attempts to solve such difficulties have involved increasing the effective surface area S of the electrode plates to decrease the amount of a change in the capacitance C with a given change in the fuel level in the tank and/or by disposing at least one additional set of electrode plates at suitably selected location(s) in the fuel tank and connecting all sets of the electrode plates in parallel with one another to thereby compensate irregular changes in the fuel level.

However, these countermeasures have caused additional problems from a practical point of view. Firstly, as the effective surface area of the two oppositely arranged electrode plates is greatly enlarged it becomes difficult to accurately maintain a predetermined distance between these two plates over the entire surface area against the undulating movements of the fuel and the aforementioned centrifugal force. Secondly, assembling of the fuel tank becomes troublesome and requires increased manhours as the surface area and/or total numbers of electrode plates increases. A further matter for serious consideration is how to give mechanical support to the electrode plates. It is usual to fasten each set of two electrode plates to one of the baffleplates, which are fixedly disposed in the fuel tank so as to divide the interior of the tank into several sections for the purpose of suppressing undulations of the fuel during running of the vehicle thereby preventing the fuel from producing noise. However, this structure is not favorable because it requires a large number of parts and many manhours, and resulting in a considerable increase in the total weight of the fuel tank.

SUMMARY OF THE INVENTION

It is an object of the present invention to provide an improved liquid container of the type having at least one set of two electrode plates arranged opposite to each other and disposed in the container such that a capacitance between the two electrode plates has a definite relation to the quantity of liquid existing in the container, which liquid container provides a highly accurate relationship between the capacitance and the liquid quantity even when the container is installed in a vehicle, such as an automobile, and can be manufactured at a relatively low cost.

A liquid container according to the invention comprises a hollow body and three capacitors for monitoring the level of the liquid in the container. Each capacitor includes a set of electrode plate assemblies. Each assembly includes (i) a generally polygonal first electrode plate which is substantially vertically disposed in the interior of the hollow body and fixed to the body so as also to serve as a baffleplate, (ii) a generally polygonal second electrode plate which is arranged opposite to the first electrode plate so as to be entirely spaced and electrically insulated from the body and first plate and mechanically fastened to the first electrode plate at a plurality of locations so as to be spaced a predetermined horizontal distance from said first electrode plate and (iii) a plurality of electrically insulating spacers which are respectively inserted between the first and second electrode plates at the plurality of locations. Each of the spacers has a thickness equal to the predetermined horizontal distance so that each capacitor has a capacitance value with a definite relation to the depth of liquid existing between the first and second electrode plates of that capacitor. The three capacitors are electrically connected to each other such that they are all connected in parallel. The electrode plates in a pair of the capacitors are angled along a substantially vertical bend line such that in plan view of the liquid container the angled electrode plates extend partly slantwise and partly substantially perpendicularly to the electrode plates of the remaining capacitor.

DESCRIPTION OF THE PREFERRED EMBODIMENTS

Figure 1:
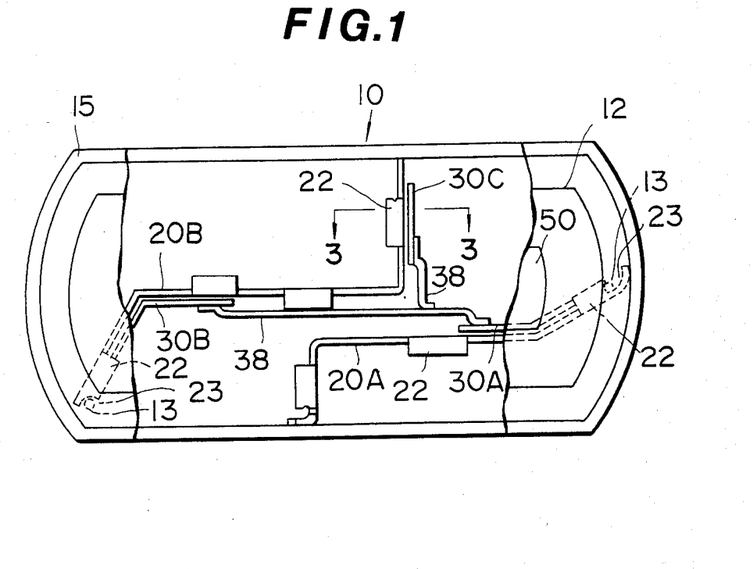
FIGS. 1 and 2 are illustrations of a preferred embodiment of an automobile fuel tank of the present invention in partly cutaway plan view and in a vertical sectional view, respectively.
Figure 2:
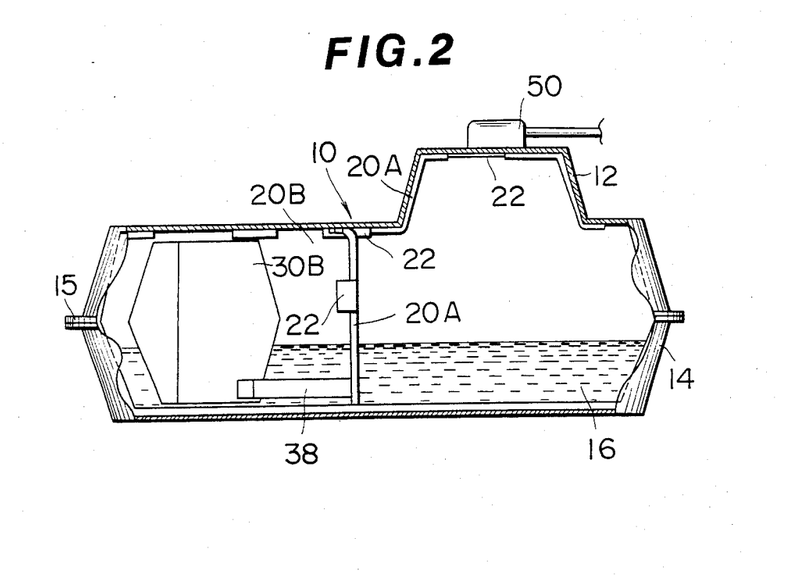

An an embodiment of the present invention, in FIGS. 1 and 2 is illustrated a fuel tank 10 for installation on an automobile. Fundamentally this fuel tank 10 is made up of an upper shell 12 and a lower shell 14, which are formed of a sheet metal and welded to each other along side peripheral flanges 15 thereof.

Figure 3:
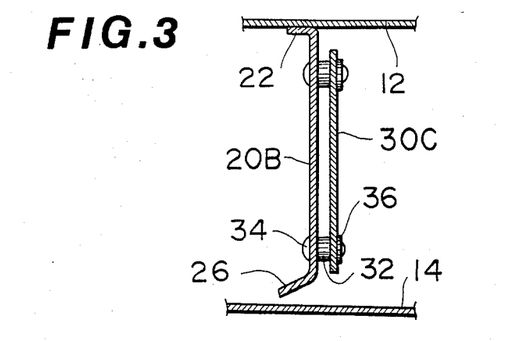
FIG. 3 is a sectional view taken along the line 3—3 in FIG. 1.

The fuel tank 10 is provided with baffleplates 20A and 20B to suppress a rapid and violent movement and/or heavy undulation of liquid fuel 16 contained in the tank 10 during operation of the vehicle. Each of the two baffleplates 20A and 20B is a metal plate disposed vertically and angled so as to become generally L-shaped or Z-shaped in plan view. In this case these baffleplates 20A, 20B are shaped and arranged such that the interior of the tank 10 is roughly divided into three sections in plan view. Each baffleplate 20A, 20B is formed with a plurality of small flanges 22 at which the baffleplate is fixed to the inner surface of the upper shell 12 by spot welding for instance. At least two of these flanges 22 (located relatively distantly from each other) of each baffleplate 20A, 20B, is formed with a locating notch 23 while the upper shell 12 is formed with locating projections 13 on its inner surface such that, by bringing the notches 23 into engagement with specified projections 13, the baffleplates 20A, 20B can be positioned exactly as designed. As can be seen in FIGS. 2 and 3, the lower end of each baffleplate 20A, 20B is spaced from the bottom of the lower shell 14 so that a probable elastic deformation of the fuel tank 10 during operation of the vehicle may not result in collision of the lower shell 14 against the baffleplates 20A, 20B. To minimize the total weight of the fuel tank 10, usually the thickness of the baffleplates 20A, 20B is made smaller than the wall thickness of the upper and lower shells 12, 14. To afford the relatively thin baffleplates 20A, 20B with a rigidity sufficient to withstand undulating movements of the liquid fuel 16, the baffleplates 20A, 20B are flanged in peripheral regions thereof. Particularly, flanging of the baffleplates 20A, 20B at the lower ends thereof as shown in FIG. 3 is effective for prevention of deformation of these plates 20A, 20B even if the bottom of the lower shell 14 undergoes an extraordinary upheaval.

Figure 4:
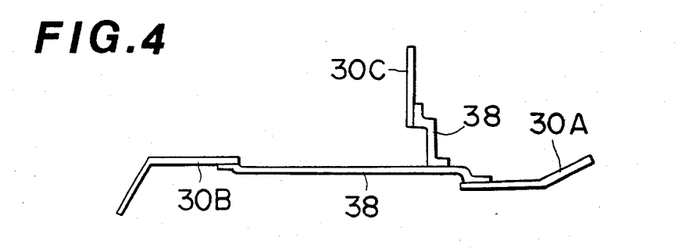
FIGS. 4 and 5 are illustrations of an electrode plate assembly used in the fuel tank of FIGS. 1 and 2 in plan and elevational views, respectively.
Figure 5:
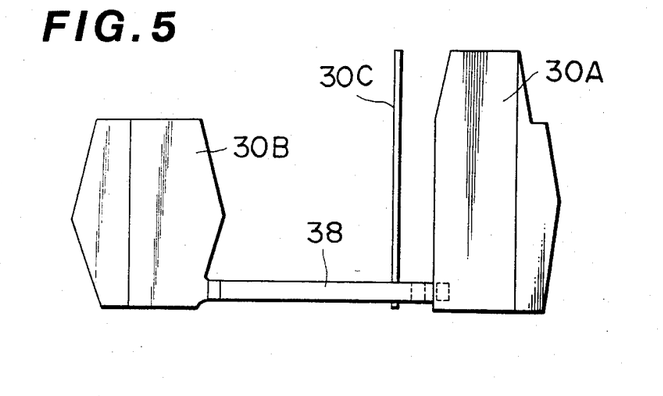

Besides the baffleplates 20A, 20B, three metal plates 30A, 30B and 30C herein called electrode plates are vertically disposed in the fuel tank 10. The first electrode plate 30A is smaller in surface area than the baffleplate 20A and is arranged parallel to a selected region of this baffleplate 20A with a short and definite horizontal distance therebetween. Since the baffleplate 20A is angled along a vertical line within this region, the electrode plate 30A too is angled similarly. The second electrode plate 30B is smaller in surface area than the other baffleplate 20B and is arranged parallel to a selected region of this baffleplate with the aforementioned horizontal distance therebetween. The third electrode plate 30C too is smaller in surface area than this baffleplate 20B and is arranged parallel to another selected region of the same baffleplate with the aforementioned horizontal distance therebetween. As shown in FIGS. 4 and 5, these electrode plates 30A, 30B and 30C are both mechanically and electrically connected to one another by an assembly of elongate bus bars 38 which are fixed to lower end regions of the electrode plates 30A, 30B, 30C. Furthermore, each electrode plate 30A, 30B, 30C is mechanically fastened to the allotted and oppositely located baffleplate 20A or 20B at a plurality of points as illustrated in FIG. 3, but the fastening is made such that each electrode plate is electrically insulated from the opposite baffleplate. It is also important to realize the intended horizontal distance between the baffleplate and the electrode plate fastened thereto. To satisfy these requirements, it is preferable to accomplish the fastening by using an electrically insulating spacer 32 and an additional insulator 36 in combination with an ordinary fastening means 34 such as a rivet or a machine screw at each fastening point, although it is also possible to dispose spacers separately from the fastening means 34.

Figure 6:
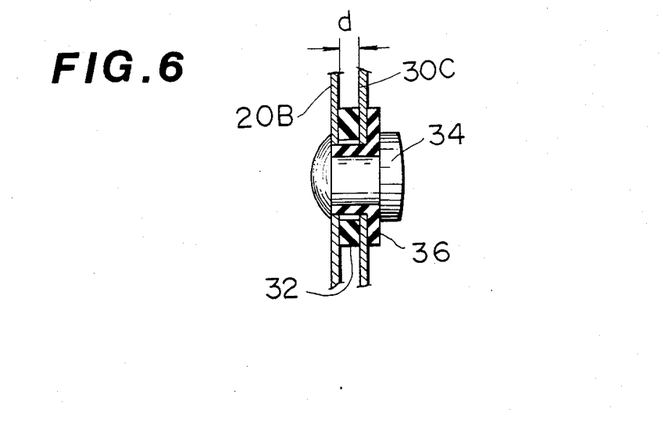
FIG. 6 is a fragmentary and sectional enlargement of FIG. 3.

FIG. 6 is an illustration of a preferred structure for combining the spacer 32 and the insulator 36 with each rivet 34 used as the fastening means. At each fastening point, the baffleplate 20B (for example) and the electrode plate 30C (for example) are formed with small holes (no numeral), respectively. The insulating spacer 32 has the shape of a ring with a central hole slightly larger than the holes in the baffleplate 20B and the electrode plate 30C, and the insulator 36 takes the form of a collar having a sleeve portion fittable into the holes in the baffleplate and the electrode plate and an annular flange portion formed at one end of the sleeve portion. The thickness of the spacer 32 is equal to the intended distance d between the baffleplate 20B and the electrode plate 30C, and the length of the collar 36 is greater than the thickness of the spacer 32. The fastening is performed by first placing the ring-shaped spacer 32 between the baffleplate 20B and the electrode plate 30C so as to be axially aligned with the holes in the two plates 20B and 30C and fit the insulator collar 36 into the holes. Then rivet 34 is inserted into the insulator collar 36 from the opposite side and the protruded end of the rivet 34 is hammered such that the flange portion of the collar 36 is compressed between the flattened end of the rivet 34 and one (electrode plate 30C in the illustration) of the two plates 20B and 30C.

To make the total weight of the fuel tank 10 as small as possible and also to minimize the load on the baffleplates 20A, 20B, it is desirable to make the electrode plates 30A, 30B, 30C thinner than the baffleplates 20A, 20B. The electrode plates 30A, 30B, 30C must be spaced from both the upper shell 12 and the lower shell 14; and preferably the lower ends of these electrode plates are much more spaced from the bottom of the lower shell 14 than the lower ends of the baffleplates 20A, 20B to prevent contact of the electrode plates 30A, 30B, 30C with the lower shell 14 even in case of considerable deformation of the lower shell 14.

In assembling the illustrated fuel tank 10, it is convenient to fasten the electrode plate 30A to the baffleplate 20A and the electrode plates 30B and 30C to the other baffleplate 20B before attaching the baffleplates 20A, 20B to the upper shell 12 of the tank 10 and before connecting the three electrode plates 30A, 30B, 30C to each another. Next the baffleplates 20A and 20B are welded to the upper shell 12 in the above described manner, and then the bus bars 38 are fixed to the electrode plates 30A, 30B, 30C to connect them to each another. A lead wire (not shown) is attached to one of the connected electrode plates 30A, 30B, 30C to electrically connect them to an oscillator circuit 50, which is mounted on the outer side of the upper shell 12 in this example; circuit 50 may alternatively be remotely located from the fuel tank 10. Finally the upper shell 12 is placed on the lower shell 14, and the two shells 12, 14 are united into the tank body by seam welding over the entire peripheral length of the side flanges 15. The upper shell 12, and hence the baffleplates 20A, 20B are electrically grounded.

Thus, the baffleplate 20A and the electrode plate 30A constitute a capacitor while the combination of the other baffleplate 20B and the electrode plates 30B and 30C constitutes two additional capacitors; these three capacitors are all connected in parallel. In this case, therefore, the total surface area of the three electrode plates 30A, 30B and 30C is taken as the effective surface area S in Equation (1), and the capacitance C in Equation (1) refers to the total capacitance of the three capacitors formed in this fuel tank 10. Since the degree of submergence of the baffleplates 20A, 20B and electrode plates 30A, 30B, 30C in the fuel 16 has a definite relation to the quantity of fuel 16 existing in the tank 10, the quantity of the fuel 16 can be detected by utilizing Equation (1). For reference, the dielectric constant $E_L$ of gasoline is about 2.0, whereas the dielectric constant $E_A$ of air is about 1.0. The baffleplates 20A, 20B and the three electrode plates 30A, 30B, 30C are shaped and arranged such that the total capacitance C varies in a linear relationship to a change in the quantity of the fuel 16 over an entire range from a practically empty state to a practically full state. If necessary, the baffleplates 20A, 20B and/or the electrode plates 30A, 30B, 30C may be formed with small holes at appropriate locations.

Figure 7:
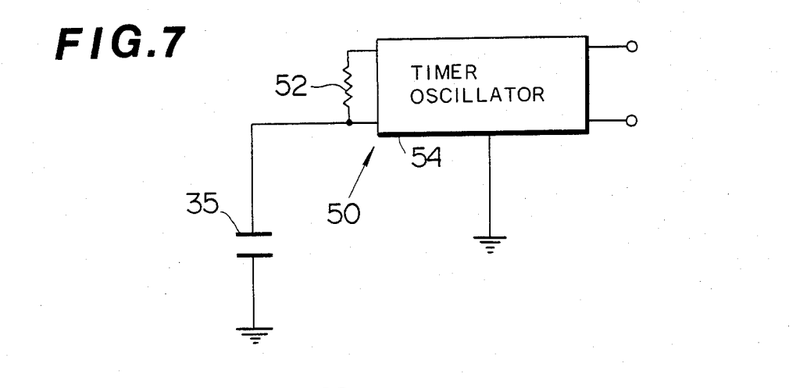
FIG. 7 is a block diagram of a signal-produciing circuit as a part of a fuel gauge combined with the fuel tank of FIGS. 1 and 2.

The aforementioned oscillator circuit 50 is an example of conventional means for generating an electrical signal representative of the variation in the value of the capacitance C according to Equation (1). As shown in FIG. 7, this circuit 50 includes an integrated circuit timer oscillator 54 and a resistor 52 connected in series with a capacitor 35 which represents the above described three capacitors in the fuel tank 10. This circuit 50 generates a pulse signal having a frequency f that varies as the capacitance C of the capacitor 35 varies as expressed by Equation (2). The output of this circuit 50 is supplied to a meter (not shown) which may be of the type for digitally indicating the quantities of fuel 16 existing in the tank 10 by directly utilizing a change in the frequency f of the output of the circuit 50. Alternatively, the output of the circuit 50 may be converted into an analog voltage signal that drives a meter of the type having a pointer.

To avoid an irregular change in the capacitance C upon movement of the fuel level in the tank 10, it is important to keep each of the electrode plates 30A, 30B, 30C in the tank 10 accurately and uniformly at the predetermined distance d from the opposite baffleplate 20A or 20B. From this viewpoint, it is recommended to arrange the insulating spacers 32 shown in FIGS. 3 and 6 at fairly short distances from one another.

Figure 8:
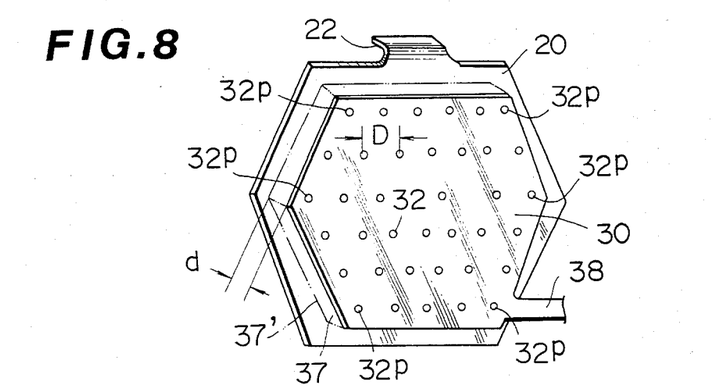
FIG. 8 is a perspective view of an electrode plate assembly for explanation of an arrangement of spacers according to the invention.

A more detailed explanation is given with reference to FIG. 8 which shows a combination of an electrode plate 20 that serves also as a baffleplate and another electrode plate 30 to be disposed in a fuel tank according to the invention. The second electrode plate 30 is smaller than the first electrode plate 20 and is so arranged as to be opposite to a central region of the first plate 20. That is, orthogonal projection 37' of a polygonal periphery 37 of the second plate 30 on the first plate 20 does not intersect the periphery of the first plate 20. Therefore, the distance d between these two electrode plates 20 and 30 is maintained at every point in the entire surface area of the second electrode plate 30. Firstly, an insulating spacer 32P of the type shown in FIG. 6 is positioned in each corner region of the polygonal shaped second electrode plate 30 because deformation, such as warping of the second electrode plate 30 as a cause of deviation of the distance d from the baffleplate 20 is most liable to occur in the corner regions. Besides, a number of similar insulating spacers 32 are arranged so as to be almost uniformly distributed over the entire surface area of the second electrode plate 30. It is desirable to make the distance D between two adjacent spacers 32 as short as possible to enhance the accuracy of the distance d between the two electrode plates 20 and 30, but an unreasonable increase in the total number of the spacers 32 is unfavorable from any point of view.

Figure 9:
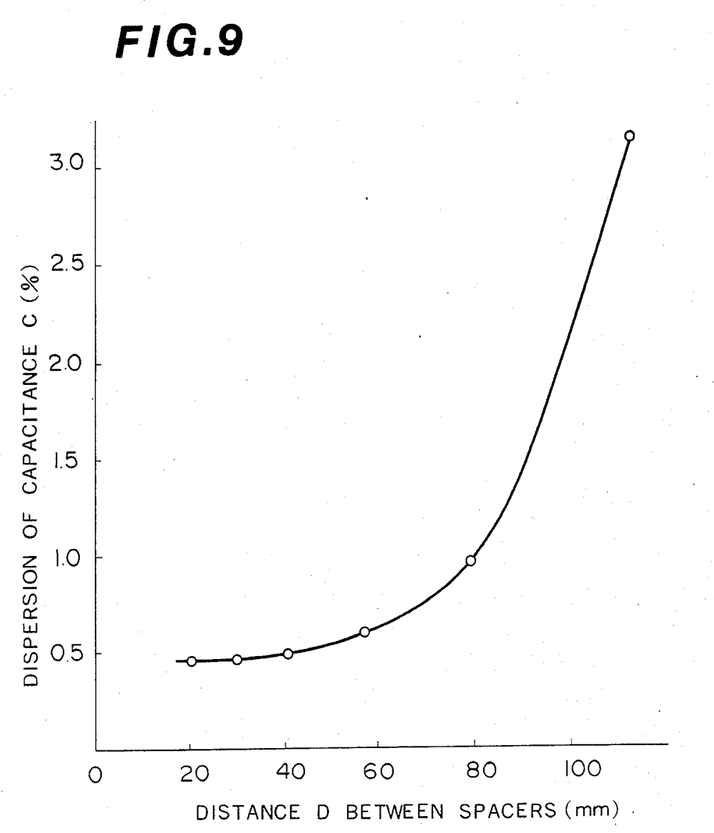
FIG. 9 is a graph showing the result of an experiment about the dependence of the accuracy of a capacitor including the electrode plate assembly of FIG. 8 on the distance between two adjacent spacers in this assembly.
Figure 10:
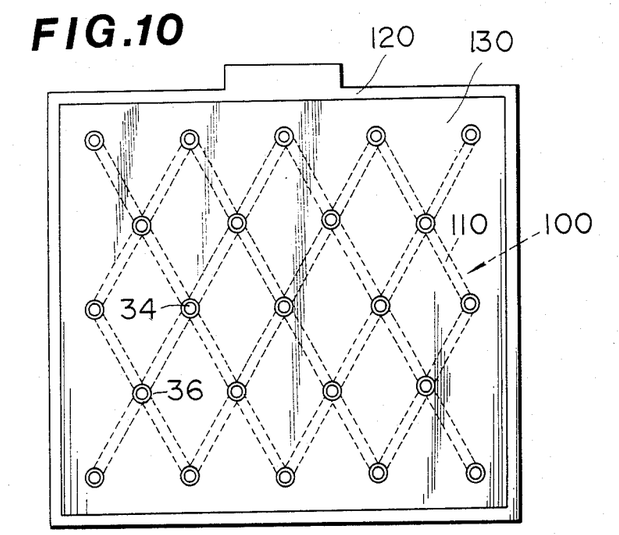
FIG. 10 is an elevational view of another electrode plate assembly according to the invention.

We have experimentally confirmed that the dispersion of the capacitance C for a given quantity of fuel 16 in the tank 10 can be made less than 1.0% by positioning the spacers 32 such that the distance D between any two adjacent spacers 32 does not exceed 80 mm. The experiments were carried out on a set of electrode plates 20, 30 having the geometry shown in FIG. 8 by using either a 0.4 mm thick steel sheet or a 1.0 mm thick steel sheet as the material of these electrode plates 20 and 30. (In each case, the thickness tolerance was ±1%.) The distance d between the two electrode plates 20 and 30 was determined at 3 mm because a suitable range of the distance d in practical fuel tanks is from about 2 mm to about 4 mm with consideration of various factors, such as the accuracy in the detection of the fuel quantity, ease of assembling and the possibility of intrusion of foreign matter into the space between the two electrode plates. The spacers 32 (including the spacers 32P positioned in the corner regions) had a thickness of 3 mm with the tolerance of ±0.5%. In the experiments, the distance D between two adjacent spacers 32 was varied over a range from 20 mm to 100 mm, and the second electrode plate 30 was fastened to the baffleplate 20 in the way as shown in FIG. 6 by utilizing all the spacers 32 employed in each experiment. The results of the experiments are graphically presented in FIG. 9. The two different thicknesses (0.4 mm and 1.0 mm) of the electrode plates 20 and 30 had no influence on the relationship between the distance D and dispersion of the capacitance C.

Figure 13:
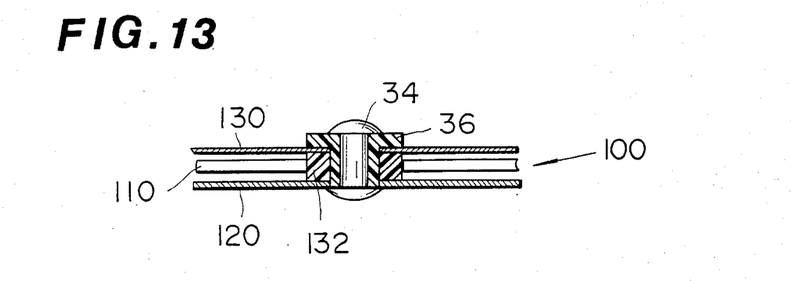
FIG. 13 is an enlarged, sectional view of a joint portion of the assembly of FIG. 10.

Referring to FIGS. 10–13, spacer network 100 facilitates fastening of an electrode plate 130 to another electrode plate 120 which serves also as a baffleplate. A number of insulating spacers as inserted between plates 120 and 130 in assembling a fuel tank. As illustrated, network 100 is a one-piece member including a a number of identical ring-shaped spacers 132 and a number of relatively thin rods 110 each of which mechanically connects one of the spacers 132 to another spacer 132 without intersecting another rod 110. As can be seen in FIG. 13, the spacers 132 are similar to the spacer 32 of FIG. 6 and have a thickness which equals the distance between the two electrode plates 120 and 130. The connecting rods 110 have a diameter far smaller than the thickness of the spacers 132 and extend perpendicularly to the central axis of the ring-shaped spacers 132, and the joint of each rod 110 and a spacer 132 is located in an axially middle region of the spacer 132.

The electrode plates 120 and 130 are formed with holes (no numeral) at locations corresponding to the locations of the spacers 132 of the spacer network 100. In assembling the electrode plates 120, 130 and the spacer network 100, the network 100 is placed on one of the electrode plates 120, 130 such that the central holes in the spacers 132 come into alignment with the holes in the electrode plate, and then the other electrode plate is placed on the network 100 to realize alignment of the holes. After that, the insulator collar 36 is inserted into each spacer 132 and fastened by means of the rivet 34 in the same manner as described with reference to FIG. 6.

The technique illustrated in FIGS. 10–13 can be modified so as not to leave the connecting rods of the spacer network between the two electrode plates. Such a modification is illustrated in FIGS. 14–18.

Figure 11:
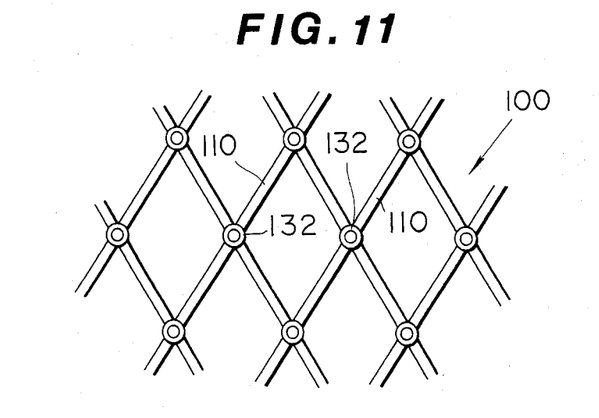
FIGS. 11 and 12 are illustrations of a portion of a spacer network used in the assembly of FIG. 10 in elevational and plan views, respectively.
Figure 12:
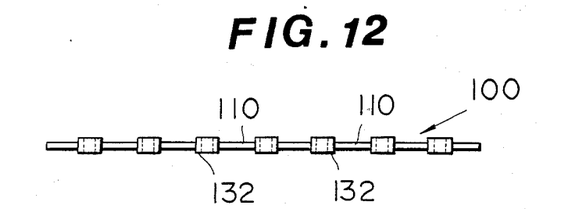
Figure 14:
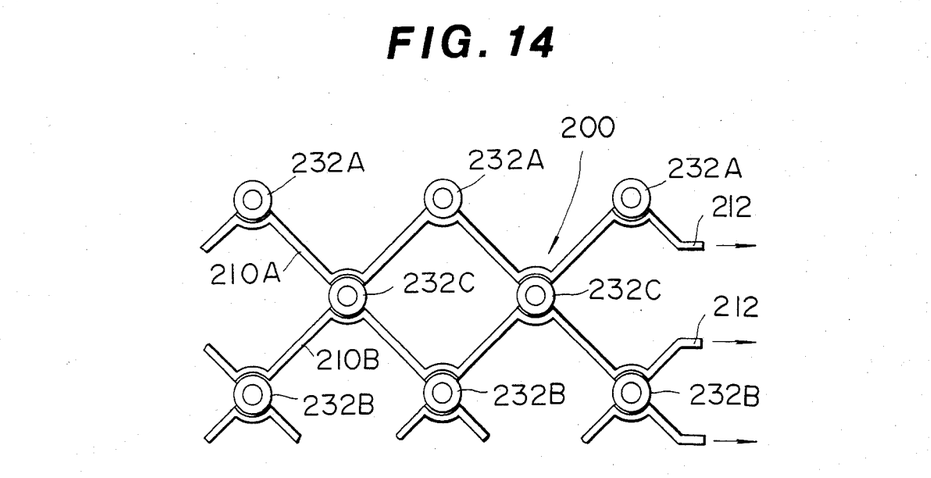
FIG. 14 is an elevational view of another spacer network for use in the present invention.
Figure 17:
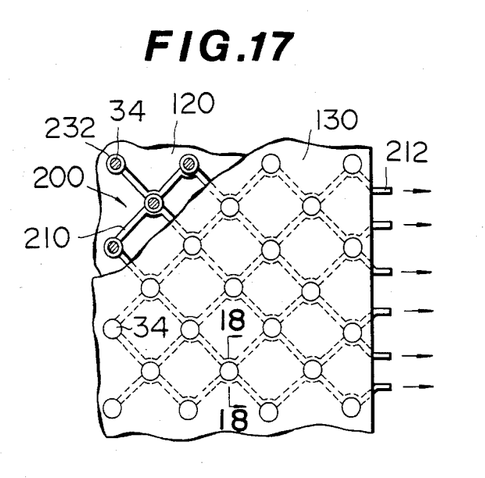
FIG. 17 is an illustration of the manner of manufacturing an electrode plate assembly according to the invention by using the spacer network of FIG. 14.

A spacer network 200 shown in FIGS. 14 and 17 is fundamentally similar to the network 100 of FIG. 11. That is, this network 200 is a one-piece member consisting of a number of spacers 232 which are identical with the spacers 132 in the network 100 of FIG. 11 and a plurality of thin connecting bars 210 which connect the spacers 232 to one another. The material of this network 200 is selected from the aforementioned synthetic resins.

In plan view of this network 200, the spacers 232 are arranged in a regular pattern. Referring to FIG. 14, a first group of spacers 232A is arranged in a row with regular intervals between each other, and a second group of spacers 232B is arranged in a similar row parallel to the row of the spacers 232A of the first group. Between these two rows of spacers 232A and 232B, spacers 232C of a third group are arranged in a parallel row such that each spacer 232C of the third group can be connected with either two adjacent spacers 232A of the first group or two adjacent spacers 232B of the second group by two equal sides of a suppositional equilateral triangle.

Figure 18:
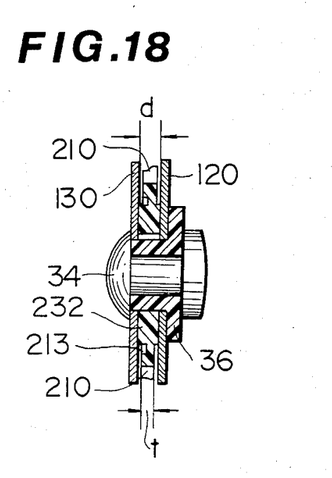
FIG. 18 is an enlarged and sectional view taken along the line 18—18 in FIG. 17.

A connecting bar 210A having a regularly zigzag shape connects the spacers 232A of the first group and the spacers 232C of the third group alternately to one another, and another connecting bar 210B having the same zigzag shape connects the spacers 232B of the second group and the spacers 232C of the third group alternately to one another. Each connecting bar 210A, 210B has arc-shaped joining sections such that the joint of the connecting bar with each spacer 232 is established along a part of the cylindrical periphery of the spacer. As shown in FIG. 18, the connecting bars 210 have a thickness t smaller than the thickness d of the spacers 232 so that, when the network 200 is sandwiched between the two electrode plates 120 and 130, the connecting bars 210 do not contact either of these electrode plates 120, 130. At one end, each connecting bar 210 extends in a straight line so as to provide a gripping section 212.

Figure 15:
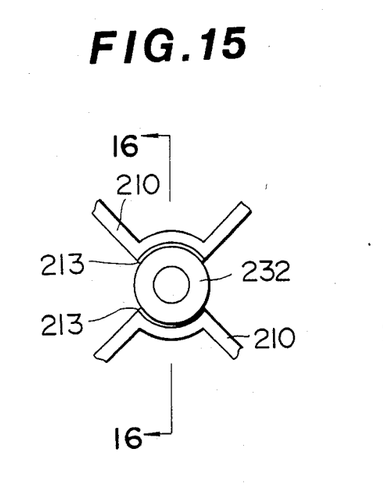
FIG. 15 is a fragmentary enlargement of FIG. 14.
Figure 16:
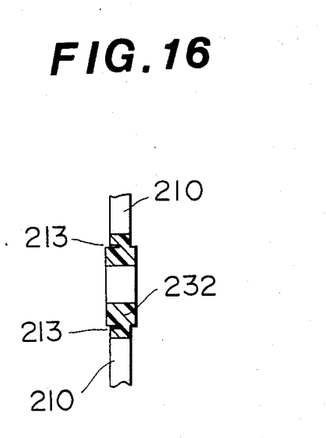
FIG. 16 is a sectional view taken along the line 16—16 in FIG. 15.

Referring to FIGS. 15 and 16, a slit or notch 213 is formed along the arc-like border between each spacer 232 and each connecting bar 210. In other words, the thickness of each connecting bar 210 is considerably reduced on the concave side of the arc-shaped joining section.

Referring to FIGS. 17 and 18, the assembling and fastening of the two electrode plates 120 and 130 with insertion of the spacer network 200 therebetween are carried out in the same way as in the case of using the spacer network 100 of FIGS. 10–13. The network 200 is designed such that the aforementioned gripping sections 212 of the connecting bars 210 protrude from the assembled electrode plates 120, 130. After completion of the assembling and fastening procedures, a pull force is applied to each connecting bar 210 in a horizontal direction as indicated by arrow in FIG. 17 to break the reduced thickness sections formed by the notches 213 and resultant separation of the connecting bar 210 from the spacers 232. In this manner, all the connecting bars 210 can be pulled out to leave only the spacers 232 between the assembled electrode plates 120 and 130.

Figure 19:
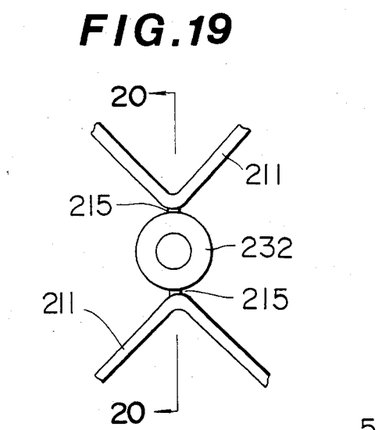
FIG. 19 is a modification of a component of the network of FIG. 14 in a view similar to FIG. 15.
Figure 20:
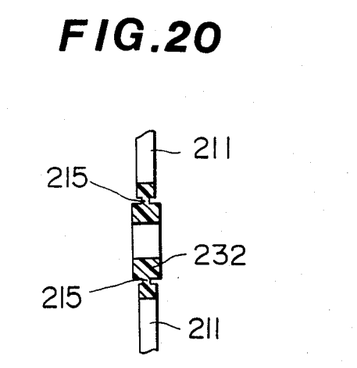
FIG. 20 is a sectional view taken along the line 20—20 in FIG. 19.

In FIGS. 19 and 20 is illustrated an alternative method of forming breakable sections in the spacer network. In this case, each connecting bar 211 is joined with each spacer 232 at an angled section by a short and thin bridge 215 that can be broken by pulling the connecting bar 211 after assembling and fastening of the two electrode plates with the spacer network inserted therebetween.

Figure 21:
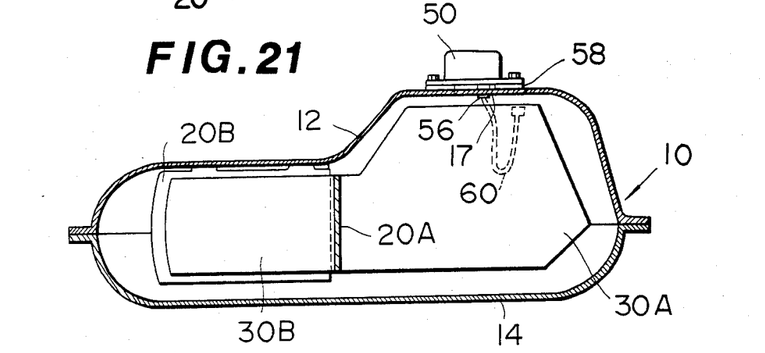
FIG. 21 is a schematic, vertical sectional view of a fuel tank also as an embodiment of the invention.

In FIG. 21 is illustrated a simple structure for establishing electrical connection between the electrode plates (in this case two plates 30A, 30B) attached to the baffleplates (in this case two plates 20A, 20B) and the oscillator circuit 50. One end of a lead wire 60 is soldered to one (30A) of the two electrode plates 30A, 30B and connected at the other end to a terminal 56 provided on a box where circuit 50 is contained. More in detail, the upper shell 12 of the fuel tank 10 is formed with a hole 17 to connect the lead wire 60 to the terminal 56. Thereafter, the circuit box is screwed to the upper shell 12 with interposition of a sealing gasket 58 so as to close the hole 17. In the completed fuel tank, the lead wire 60 is drooping as illustrated and, hence, freely swings during running of the vehicle. However, such a state of the lead wire 60 has a tendency to prevent accurate detection of the above described capacitance C because the swinging movement of the lead wire 60 in the fuel produces a floating capacitance. The floating capacitance adversely influences the accuracy of measurement of the capacitance C since actual values of the capacitance C are only of the order of tens to hundreds of picofarads. Therefore it is desirable to prevent any movement of the lead wire 60 after fuel tank 10 has been completely assembled.

Figure 22:
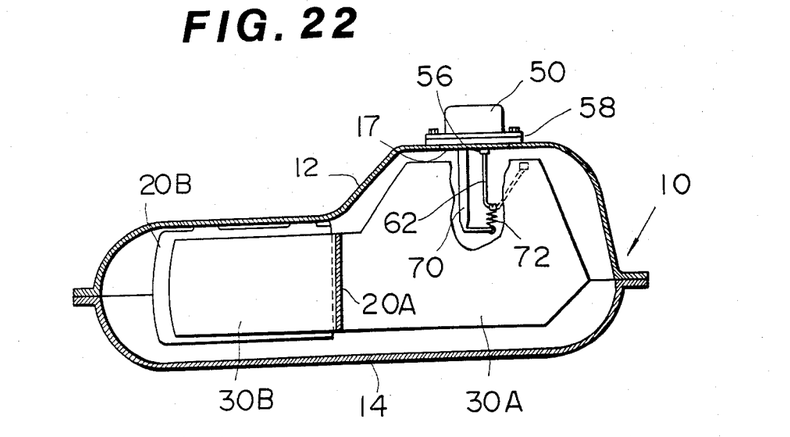
FIG. 22 is an illustration of a local modification of the fuel tank of FIG. 21 in a similar view.
Figure 23:
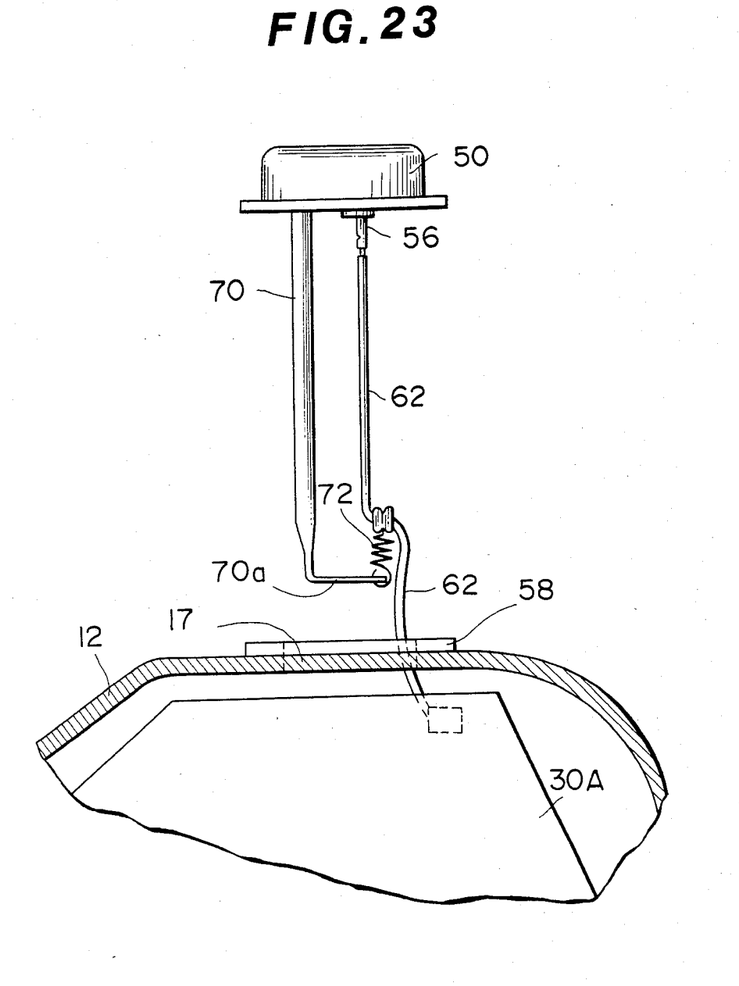
FIG. 23 is a fragmentary enlargement of FIG. 22.
Figure 24:
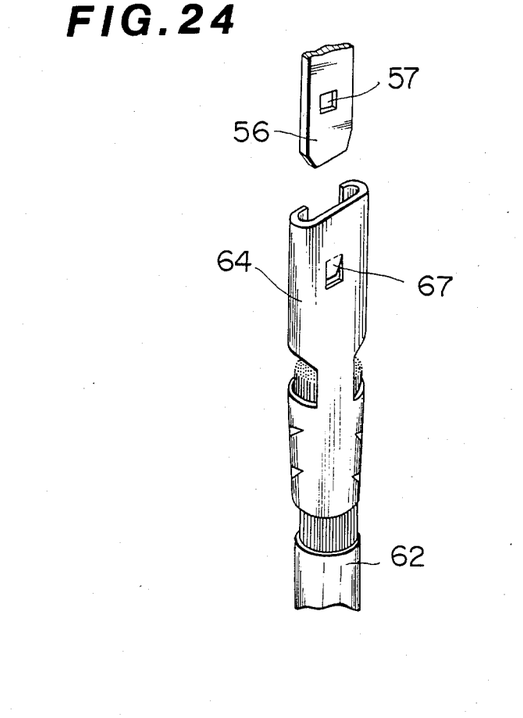
FIG. 24 is an exploded view of an electric connector part of the fuel tank of FIGS. 22 and 23.

In FIGS. 22–24 is illustrated a preferred method of connecting the electrode plate 30A to the circuit 50. In this case a rigid rod 70 is fixed to the bottom of the box containing the circuit 50 so as to intrude into the fuel tank 10 through the hole 17 of the upper shell 12, and a lower end portion 70a of this rod 70 is bent at a suitable angle. One end of lead wire 62 having an insulating covering, is soldered to the electrode plate 30A; the other end of wire 62 is connected to a terminal 56 provided on the circuit box. As shown in FIG. 24, the terminal 56 takes the form of a male connector or plug, and a female connector or receptacle 64 is fixed to the end portion of the lead wire 62. When the plug 56 is fitted into the receptacle 64, a detent tongue 67 of the receptacle 64 engages a hole 57 formed in the plug 56 to prevent unintentional disconnection. After connection of the covered lead wire 62 to the terminal 56, one end of coil spring 72 is hooked at its one to the bent protion 70a of the rod 70; the other end of spring 72 is connected to the covered lead wire 62 so as to keep the lead wire 62 in a tense state. Then, the rod 70 is inserted into the fuel tank 10 and the circuit box is screwed to the upper shell 12 with interposition of the sealing gasket 58. The lead wire 62 in the fuel tank 10 remains in the tense state and therefore does not swing or move in any other manner even though the fuel level varies or the fuel moves in undulations.

Figure 25:
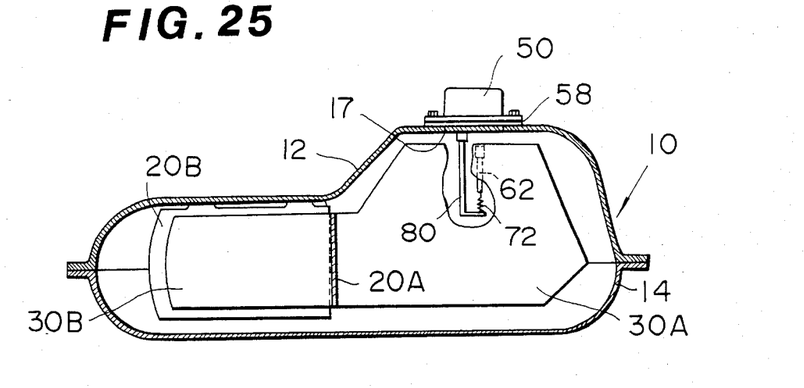
FIG. 25 is an illustration of a partial modification of the fuel tank of FIG. 22 in a similar view.

FIG. 25 illustrates an alternative method wherein a rigid rod 80 of an electrically conducting material extends downwards from the circuit box bent in its lower end portion of rod 80 is bent similarly to the rod 70 in FIG. 23. Rod 80 serves as part of the electrical circuit. One end of covered lead wire 62, having a relatively short length is fixed to the electrode plate 30A. One end of coil spring 72 is attached to the bent portion of the conductor rod 80; the free end of the lead wire 62 is fixed to the other end of spring 72 such that a tension is applied to the lead wire 62 lengthwise. In the completed fuel tank 10, the lead wire 62 remains vertically oriented in a tensioned state. Because of the shortened length of the lead wire 62 and the positive manner of applying a tension to the lead wire 62, any movement of the lead wire 62 can be more positively prevented than in the case of FIG. 22.

What is claimed is:

1. A method of producing, in a liquid container having a hollow container body, a plurality of capacitors electrically connected in parallel and disposed in the container body such that the capacitance of each capacitor varies as the level of liquid in the container body varies, each of the capacitors having an electrode plate assembly including two generally polygonal electrode plates arranged opposite to and spaced from each other and disposed substantially vertically in the container body, the method comprising the steps of:

for each electrode plate assembly, preparing a provisional assembly of a first electrode plate having a plurality of holes and a shape enabling it to serve as a baffleplate, placing a second electrode plate opposite to said first electrode plate, the second plate having a plurality of holes correspondingly to said holes of said first electrode plate, inserting a spacer network between said first and second electrode plates to provide a predetermined distance between said first and second electrode plates, said spacer network being a one-piece member formed of an electrically insulating material and including plural generally annular spacers arranged correspondingly to said holes of said first and second electrode plates, said spacer having a thickness equal approximately to said distance and a plurality of relatively thin connecting bars each extending in a zigzag manner to breakably connect a predetermined number of said spacers to one another by relatively weak joints with a generally arc-like part of the outer periphery of each spacer, said spacer having an end portion protruding from the space between said first and second electrode plates, inserting a fastener in the center hole of each spacer through the aligned holes of said first and second electrode plates, and fixing each of said fasteners to said first and second electrode plates;

pulling each of said connecting bars at said end portion to cause the joints between the pulled connecting bar and each of said number of spacers to break to thereby separate the pulled connecting bar from all of said number of spacers, and then removing the separated connecting bar from said provisional assembly, whereby said provisional assembly is converted into said electrode plate assembly, wherein said plurality of spacers remain sandwiched between said first and second electrode plates and are spaced from one another; and substantially vertically disposing each electrode plate assembly in said container body at a predetermined location, and fixing said first electrode plate of each electrode plate assembly to said container body.

2. The method of claim 1 wherein said spacers in said spacer network are arranged in two substantially parallel rows, each of said connecting bars being so shaped as to connect the spacers in one of said two rows and the spacers in the other row alternately to one another.

3. The method of claim 1 wherein said spacer network is formed with a notch along the joints between each connecting bar and said generally arc-like part of the outer periphery of each spacer.

4. The method of claim 1 wherein said spacer network has a plurality of short bridge portions each of which extends from said generally arc-like part of the outer periphery of each spacer to one of said connecting bars and is thinner than each of said connecting bars.

5. The method of claim 1 wherein the distance of each of said plurality of spacers from the spacers adjacent thereto is not greater than 80 mm.

6. The method of claim 1 wherein said spacer network is formed of a synthetic resin.

7. The method of claim 1 wherein said fastening means is fitted in an electrically insulating flanged sleeve located in the center hole of each spacer.

8. A method of producing in a liquid container having a hollow container body, a plurality of capacitors electrically connected in parallel and disposed in the container body such that the capacitance of each capacitor varies as the level of liquid in the container body varies, each of the capacitors having an electrode plate assembly including two generally polygonal electrode plates arranged opposite to and spaced from each other and disposed substantially vertically in the container body, each electrode plate assembly having a provisional assembly of a first electrode plate having a plurality of holes and a shape enabling it to serve as a baffleplate, a second electrode plate located opposite to said first electrode plate, the second plate having a plurality of holes correspondingly to said holes of said first electrode plate, a spacer network being located between said first and second electrode plates to provide a predetermined distance between said first and second electrode plates, said spacer network being a one-piece member formed of an electrically insulating material and including plural generally annular spacers arranged correspondingly to said holes of said first and second electrode plates, said spacer having a thickness equal approximately to said distance and a plurality of relatively thin connecting bars each extending in a zigzag manner to breakably connect a predetermined number of said spacers to one another by relatively weak joints with a generally arc-like part of the outer periphery of each spacer, said spacer having an end portion protruding from the space between said first and second electrode plates, a fastener being located in the center hole of each spacer through the aligned holes of said first and second electrode plates, and each of said fasteners being fixed to said first and second electrode plates, the method comprising:

pulling each of said connecting bars at said end portion to cause the joints between the pulled connecting bar and each of said number of spacers to break to thereby separate the pulled connecting bar from all of said number of spacers, and then removing the separated connecting bar from said provisional assembly, whereby said provisional assembly is converted into said electrode plate assembly, wherein said plurality of spacers remain sandwiched between said first and second electrode plates and are spaced from one another; and substantially vertically disposing each electrode plate assembly in said container body at a predetermined location, and fixing said first electrode plate of each electrode plate assembly to said container body.

9. The method of claim 8 wherein said spacers in said spacer network are arranged in two substantially parallel rows, each of said connecting bars being so shaped as to connect the spacers in one of said two rows and the spacers in the other row alternately to one another.

10. The method of claim 8 wherein said spacer network is formed with a notch along the joints between each connecting bar and said generally arc-like part of the outer periphery of each spacer.

11. The method of claim 8 wherein said spacer network has a plurality of short bridge portions each of which extends from said generally arc-like part of the outer periphery of each spacer to one of said connecting bars and is thinner than each of said connecting bars.

12. The method of claim 8 wherein the distance of each of said plurality of spacers from the spacers adjacent thereto is not greater than 80 mm.

13. The method of claim 8 wherein said spacer network is formed of a synthetic resin.

14. The method of claim 8 wherein said fastening means is fitted in an electrically insulating flanged sleeve located in the center hole of each spacer.

* * * * *